A. A. EWALD.
HOSE COUPLING.
APPLICATION FILED APR. 17, 1919. RENEWED MAY 3, 1920.
1,361,758. Patented Dec. 7, 1920.
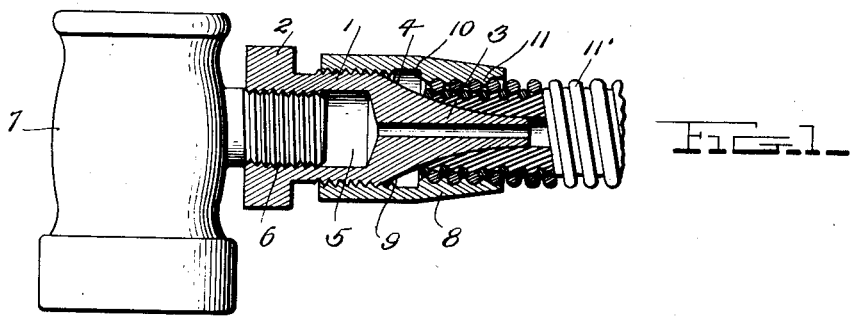
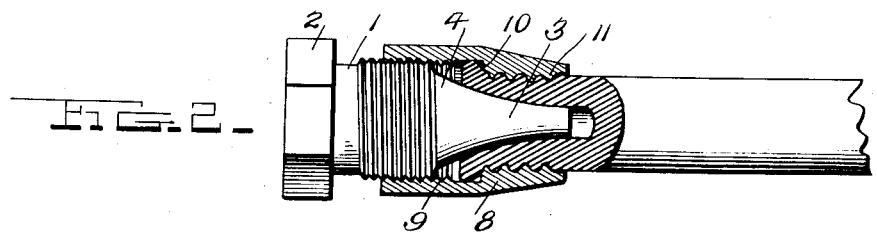
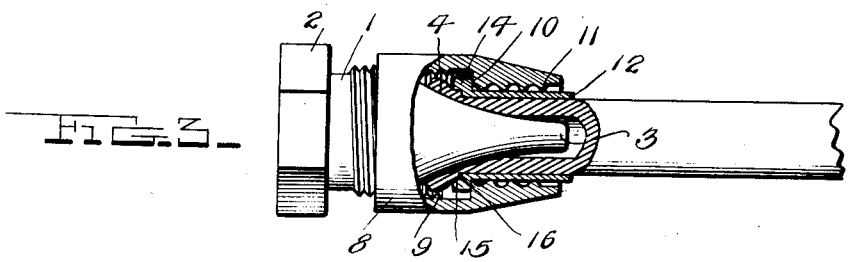
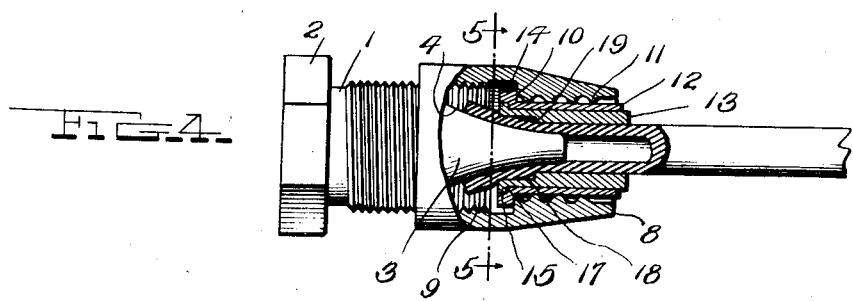
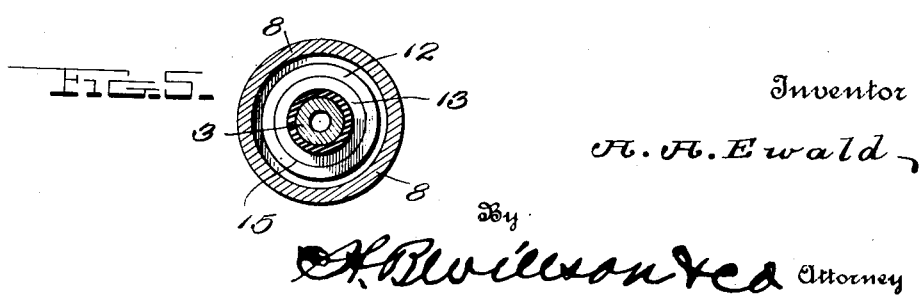
Inventor
A. A. Ewald

UNITED STATES PATENT OFFICE.

ARNO A. EWALD, OF OAKFIELD, WISCONSIN.

HOSE-COUPLING.

1,361,758.

Specification of Letters Patent. Patented Dec. 7, 1920.

Application filed April 17, 1919, Serial No. 290,726. Renewed May 3, 1920. Serial No. 378,654.

*To all whom it may concern:*

Be it known that I, ARNO A. EWALD, citizen of the United States, residing at Oakfield, in the county of Fond du Lac and State of Wisconsin, have invented certain new and useful Improvements in Hose-Couplings; and I do declare the following to be a full, clear, and exact description of the invention, such as will enable others skilled in the art to which it appertains to make and use the same.

My invention relates to improvements in hose couplings designed primarily for use in connection with compressed air hoses, such as those used for inflating automobile tires, and blowing chips, shavings, etc., from numerous kinds of machines. The device is also applicable to the hoses of welding machines, vulcanizers, and in fact upon any kind of apparatus using flexible air hose.

The principal object of the invention is to provide a coupling which may be used to equal advantage upon practically all standard sizes of air hose, ranging from the usual bicycle pump tubing to hose having an external diameter of approximately three-quarters of an inch.

A further object is to provide a coupling which may not only be used upon the well known rubber hoses having no covering, but upon metal covered hoses such as those now commonly used for the inflation of automobile tires.

Yet another object is to provide a coupling of extreme simplicity and inexpensive manufacture, and one which may be quickly and easily adapted to the particular type or size of hose with which it is to be used.

With the foregoing in view, the invention resides in the novel features of construction and association of parts herein-after described and claimed, the descriptive matter being supplemented by the accompanying drawings.

Figure 1 is a longitudinal section of a coupling constructed in accordance with my invention, showing the same installed for connecting a metal covered air hose to the air discharge head commonly used for inflating vehicle tires.

Fig. 2 is a side elevation partly in section, showing the manner in which a thick walled rubber hose is clamped in the coupling.

Figs. 3 and 4 are views similar to Fig. 2, illustrating the manner in which bushings are used for adapting the coupling to hoses of comparatively small size.

Fig. 5 is a vertical transverse section on the plane indicated by the line 5—5 of Fig. 4.

In the drawings above briefly described, the numeral 1 designates a cylindrical plug preferably having a hexagonal head 2 on one end for engagement with a wrench, while the other end 3 of said body is of conical formation, the peripheral surface 4 of said conical end being curved inwardly from the base to the apex of the cone. By this formation, the end 3 of the plug 1 may be inserted in any of the air hoses having standard internal diameters. The plug is of course provided with a bore 5 for communication with the hose and this bore is counterbored and threaded at 6 for attachment to an air discharge head 7 or any other part in connection with which the coupling is to be used.

A hose clamping sleeve 8 is counterbored and threaded at one end as seen at 9, said counterbored end being threaded on the cylindrical part of the plug 1. The juncture of the bore and counterbore of the sleeve 8 forms an internal circumferential shoulder 10, and said bore is provided with relatively coarse threads 11 adapted either to thread on the wrappings 11' of the metal covered air hose as seen in Fig. 1, or to embed in the exterior of a thick walled rubber hose as depicted in Fig. 2. In either instance, when the plug 1 is tightly threaded into the sleeve 8, the tube will be anchored in an air tight manner, being gripped tightly between the conical plug end 3 and the sleeve. When used as seen in Fig. 2, both the threads 11 and the shoulder 10 are instrumental in holding the hose against slippage.

For adapting the coupling for use on comparatively small sizes of hose, I provide an outer bushing 12 and an inner bushing 13, and one or both of these bushings may be used, according to the external diameter of the hose. The bushing 12 is provided with an external rib 14 received in the counterbore 9 and bearing against the shoulder 10, said rib being formed on the inner end of the bushing, which end is counterbored at 15 to provide an internal shoulder 16. When only the bushing 12 is used (see Fig. 3) the inner end of said bushing and the shoulder 16 embed in the exterior of the hose and hold the same against slippage, and when the inner bushing 13 is employed, a peripheral rib 17 thereof is received in the counterbore 15 and bears against the shoulder 16. The inner end of the bushing 13 is counterbored at 18 to provide an internal shoulder 19, and the inner edge of the bushing 13, together with its shoulder 19, tightly grip the smaller sizes of hose.

By manufacturing the coupling in the novel manner shown and described, it meets all conditions encountered in connecting compressed air hoses upon numerous forms of apparatus and machines, and particular attention is directed to the fact that regardless of the internal or external diameter of the hose, the coupling may be used to equal advantage thereon by inserting the proper number of bushings or by omitting all of such bushings, as required.

The device is extremely simple and inexpensive, yet is of great advantage and since excellent results have been obtained from the details disclosed, they may well be followed, but it is to be understood that within the scope of the invention as claimed, numerous minor changes may well be made.

I claim:

1. In a hose coupling, a cylindrical longitudinally bored plug having a wrench head on one end, the other end of said plug being in the form of a cone whose peripheral surface is curved inwardly from its base to its apex for insertion into the ends of hoses having different standard internal diameters, and a hose clamping sleeve counterbored at one end to provide an internal shoulder adapted to embed in the covering of certain styles of hoses, or to abut a bushing for a smaller hose, said counterbored end being threaded on the cylindrical portion of said plug, the smaller end of said bore having coarse rounded threads adapted either to embed in the flexible coverings of certain forms of hose or to thread on the wrapping of a metal covered hose.

2. In a hose coupling, a cylindrical, bored plug having a conical end whose peripheral surface is curved inwardy from the base to the apex of the cone, for insertion into the ends of hoses having different standard internal diameters, a hose clamping sleeve counterbored at one end to provide an internal shoulder, said counterbored end being threaded on the cylindrical portion of said plug, a bushing in the other end of said sleeve having an external, circumferential rib at its inner end for contact with said shoulder of the sleeve, said inner end of said bushing being counterbored, for a short distance to provide a shoulder adapted for antislipping engagement with a relatively small hose, and an additional bushing in said first named bushing having an external rib received in the counterbore thereof, said additional bushing being counterbored at its inner end to provide a shoulder adapted to engage a still smaller hose.

3. A structure as specified in claim 2, said other end of said sleeve having coarse internal threads adapted either to thread on the wrappings of a metal covered hose, or to embed in the exterior of a thick walled rubber hose.

In testimony whereof I have hereunto set my hand.

ARNO A. EWALD.